(12) United States Patent
Martin et al.

(10) Patent No.: US 10,708,844 B2
(45) Date of Patent: Jul. 7, 2020

(54) WIRELESS TELECOMMUNICATIONS SYSTEM, TERMINAL DEVICE, BASE STATION AND METHODS

(71) Applicant: Sony Corporation, Tokyo (JP)

(72) Inventors: Brian Alexander Martin, Basingstoke (GB); Yuxin Wei, Basingstoke (GB); Martin Warwick Beale, Basingstoke (GB); Shinichiro Tsuda, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 52 days.

(21) Appl. No.: 16/075,264

(22) PCT Filed: Jan. 13, 2017

(86) PCT No.: PCT/EP2017/050649
§ 371 (c)(1),
(2) Date: Aug. 3, 2018

(87) PCT Pub. No.: WO2017/133880
PCT Pub. Date: Aug. 10, 2017

(65) Prior Publication Data
US 2019/0014616 A1 Jan. 10, 2019

(30) Foreign Application Priority Data
Feb. 4, 2016 (EP) .................................... 16154318

(51) Int. Cl.
*H04B 7/14* (2006.01)
*H04B 17/40* (2015.01)
(Continued)

(52) U.S. Cl.
CPC .............. *H04W 40/22* (2013.01); *H04B 7/14* (2013.01); *H04B 17/40* (2015.01); *H04L 5/0096* (2013.01);
(Continued)

(58) Field of Classification Search
CPC .... H04B 7/14–17; H04B 17/0082–409; H04L 5/003–0098; H04W 4/06–70;
(Continued)

(56) References Cited

U.S. PATENT DOCUMENTS

| 2002/0081992 A1 | 6/2002 | Keller et al. |
| 2010/0110968 A1* | 5/2010 | Lee .................... H04B 7/2606 370/315 |

(Continued)

FOREIGN PATENT DOCUMENTS

| WO | WO-2015002456 A1 * | 1/2015 | ............ H04W 48/20 |

OTHER PUBLICATIONS

English translation of International Search Report dated Mar. 24, 2017 in PCT/EP2017/050649.
(Continued)

*Primary Examiner* — Timothy J Weidner
(74) *Attorney, Agent, or Firm* — Xsensus LLP

(57) ABSTRACT

A first terminal device for use in a wireless telecommunications system includes one or more base stations each forming a respective network node of the wireless telecommunications system and a plurality of terminal devices, wherein each of the terminal devices is operable to be established as a relay node via which each of the other terminal devices is operable to communicate with at least one of the base stations. The first terminal device includes a controller operable to determine a value of an operational characteristic associated with the first terminal device, and a transceiver unit operable to receive, from each of the other (Continued)

terminal devices, signalling indicative of a value of the operational characteristic associated with that terminal device.

20 Claims, 4 Drawing Sheets

(51) Int. Cl.
  *H04L 5/00*   (2006.01)
  *H04W 8/24*   (2009.01)
  *H04W 28/02*   (2009.01)
  *H04W 40/10*   (2009.01)
  *H04W 40/22*   (2009.01)
  *H04W 48/20*   (2009.01)
  *H04W 56/00*   (2009.01)
  *H04W 76/15*   (2018.01)
  *H04W 84/18*   (2009.01)
  *H04W 88/04*   (2009.01)
  *H04W 88/06*   (2009.01)
  *H04W 88/10*   (2009.01)
  *H04W 92/08*   (2009.01)
  *H04W 92/10*   (2009.01)
  *H04W 92/18*   (2009.01)
  *H04W 92/20*   (2009.01)

(52) U.S. Cl.
  CPC ........... *H04W 8/24* (2013.01); *H04W 28/021* (2013.01); *H04W 28/0221* (2013.01); *H04W 40/10* (2013.01); *H04W 48/20* (2013.01); *H04W 56/0025* (2013.01); *H04W 76/15* (2018.02); *H04W 84/18* (2013.01); *H04W 88/04* (2013.01); *H04W 88/06* (2013.01); *H04W 88/10* (2013.01); *H04W 92/08* (2013.01); *H04W 92/10* (2013.01); *H04W 92/18* (2013.01); *H04W 92/20* (2013.01)

(58) Field of Classification Search
  CPC ..... H04W 8/18–245; H04W 28/02–14; H04W 36/0005–385; H04W 40/005–38; H04W 48/02–20; H04W 56/001–0025; H04W 72/005–14; H04W 76/10–50; H04W 85/005; H04W 84/18–22; H04W 88/02; H04W 88/04–12; H04W 92/10–12; H04W 92/16–20
  See application file for complete search history.

(56)     References Cited

U.S. PATENT DOCUMENTS

| | | | |
|---|---|---|---|
| 2014/0308966 A1 | 10/2014 | Wang et al. | |
| 2015/0163712 A1* | 6/2015 | Ljung | H04B 7/14 455/436 |
| 2015/0349874 A1* | 12/2015 | Bhargava | H04W 48/20 370/315 |
| 2016/0135203 A1 | 5/2016 | Kim et al. | |
| 2018/0027429 A1* | 1/2018 | Li | H04W 40/22 455/426.1 |
| 2018/0139682 A1* | 5/2018 | Xu | H04W 88/04 370/315 |

OTHER PUBLICATIONS

LTE for UMTS: OFDMA and SC-FDMA Based Radio Access, Harris Holma and Antti Toskala, Wiley 2009, ISBN 978-0-470-99401-6.

* cited by examiner

WIRELESS TELECOMMUNICATIONS SYSTEM, TERMINAL DEVICE, BASE STATION AND METHODS

CROSS-REFERENCE TO RELATED APPLICATIONS

This application is a national stage (under 35 U.S.C. 371) of International Patent Application No. PCT/EP2017/050649, filed Jan. 13, 2017, claiming priority to European Patent Application No. 16154318.6, filed Feb. 4, 2016, both of which are herein incorporated by reference in their entirety.

TECHNICAL FIELD OF THE DISCLOSURE

The present disclosure relates to a wireless telecommunications system, terminal device, base station and methods.

BACKGROUND OF THE DISCLOSURE

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is expected to increase rapidly.

However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network.

In order to address these limitations, in LTE release-12 the ability for LTE communications devices to perform device-to-device (D2D) communications is introduced. D2D communications allow communications devices that are in close proximity to directly communicate with each other, both when within and when outside of a coverage area or when the network fails. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Whilst D2D communications techniques can provide an arrangement for communicating between devices when the communications devices are outside a coverage area provided by mobile communications network, the D2D communications techniques can also provide an arrangement for extending a coverage area of the mobile communications network, when one of the communications devices is within the coverage area and another is outside the coverage area. There may also be situations in which D2D communications between communications devices which are both within a coverage area of a mobile communications network are supported (thus allowing network capacity to be increased, for example).

There are several issues to consider when implementing such D2D communication techniques, however. For example, in a coverage extension scenario, in which a first communications device which is out of the coverage area of a mobile communications network performs communication with the mobile communications network via a second communications device which is within the coverage area of the mobile communications network (the second communications device therefore acting as a D2D relay node), the system must manage selection of a relay node when the first communications device initially leaves the coverage area of the mobile telecommunications network, switching of relay nodes when the first communications device leaves the coverage area of one relay node and enters the coverage area of another, and determination of the suitability of various second communication devices for acting as the relay node. Similarly, even if both the first and second communication devices are within the coverage area of the mobile telecommunications network, the system needs to manage which of the second communication devices is selected as the relay node and to manage mobility of the first communications device as it moves from the coverage area of one second communications device or base station to another second communications device.

The need to perform such management of LTE D2D communications in a wireless telecommunications network results in additional data processing in the network. It is therefore desirable to consider alternative arrangements to LTE D2D communication which allow coverage extension, increased network capacity and/or increased network efficiency.

SUMMARY OF THE DISCLOSURE

In a first aspect, the present technique provides a first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the first terminal device comprises: a controller operable to determine a value of an operational characteristic associated with the first terminal device; and a transceiver unit operable to receive, from each of the other terminal devices, signalling indicative of a value of the operational characteristic associated with that terminal device; wherein the transceiver unit is operable to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected on the basis of the value of the operational characteristic associated with the first terminal device as determined by the controller and the values of the operational characteristic associated with the other terminal devices as received by the transceiver unit from the other terminal devices.

In an embodiment, prior to establishment of the second terminal device as a relay node, the first terminal device is a relay node.

In an embodiment, the operational characteristic is a radio channel condition of a radio communication channel between each respective terminal device and at least one of the base stations, and the terminal device with the best radio channel condition is selected as the second terminal device.

In an embodiment, the radio communication channel between each respective terminal device and the at least one of the base stations is implemented via one of a plurality of different radio access technologies (RATs).

In an embodiment, the operational characteristic is a radio channel condition of a radio communication channel between each respective terminal device and each of the other terminal devices, and the terminal device with the best radio channel condition is selected as the second terminal device.

In an embodiment, the operational characteristic is a predetermined capability of each terminal device, and the terminal device with the most favourable predetermined capability is selected as the second terminal device.

In an embodiment, the operational characteristic is a battery energy level of each terminal device, and the terminal device with the highest battery energy level is selected as the second terminal device.

In an embodiment, the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

In an embodiment, the operational characteristic is a user selection indicator, the value of the operational characteristic for each respective terminal device being indicative of whether or not that terminal device has been selected, and wherein a terminal device which has been selected by the user is selected as the second terminal device.

In an embodiment, the controller is operable to select the second terminal device on the basis of the value of the operational characteristic associated with the first terminal device as determined by the controller and the values of the operational characteristic associated with the other terminal devices as received by the transceiver unit, and the relay node establishment signalling transmitted to the first one of the base stations by the second transceiver is indicative of the selected second terminal device.

In an embodiment, the relay node establishment signalling transmitted to the first one of the base stations by the second transceiver is indicative of the value of the operational characteristic associated with the first terminal device as determined by the controller and the values of the operational characteristic associated with the other terminal devices as received by the transceiver unit.

In an embodiment, the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein when the operational characteristic is indicative of the ability of each terminal device to act as a control plane relay node via which each of the other terminal devices is operable to exchange control plane signalling with at least one of the base stations, the relay node establishment signalling provides the first one of the base stations with an indication that one of the terminal devices should be established as the control plane relay node, the one of the terminal devices that should be established as the control plane relay node being determined on the basis of the values of the operational characteristic associated with each of the terminal devices; and when the operational characteristic is indicative of the ability of each terminal device to act as a user plane relay node via which each of the other terminal devices is operable to exchange user plane data with at least one of the base stations, the relay node establishment signalling provides the first one of the base stations with an indication that one of the terminal devices should be established as the user plane relay node, the one of the terminal devices that should be established as the user plane relay node being determined on the basis of the values of the operational characteristic associated with each of the terminal devices.

In a second aspect, the present technique provides a base station for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the base station comprises: a transceiver operable to receive relay node establishment signalling from a first one of the terminal devices, the relay node establishment signalling providing an indication that a second one of the terminal devices should be established as a relay node via which each of the other terminal devices is operable to communicate with at least one of the base stations; and a controller operable to perform an operation to establish, on the basis of the received relay node establishment signalling, a second one of the terminal devices as a relay node via which each of the other terminal devices is operable to communicate with at least one of the base stations, wherein the second terminal device established as the relay node is selected on the basis of a value of a operational characteristic associated with the first terminal device as determined by the first terminal device and a value of the operational characteristic associated with each of the other terminal devices as received by the first terminal device from each of the other terminal devices.

In an embodiment, the operational characteristic is a radio channel condition of a radio communication channel between each respective terminal device and at least one of the base stations, and the terminal device with the best radio channel condition is selected as the second terminal device.

In an embodiment, the radio communication channel between each respective terminal device and the at least one of the base stations is implemented via one of a plurality of different radio access technologies (RATs).

In an embodiment, the operational characteristic is a radio channel condition of a radio communication channel between each respective terminal device and each of the other terminal devices, and the terminal device with the best radio channel condition is selected as the second terminal device.

In an embodiment, the operational characteristic is a predetermined capability of each terminal device, and the terminal device with the most favourable predetermined capability is selected as the second terminal device.

In an embodiment, the operational characteristic is a battery energy level of each terminal device, and the terminal device with the highest battery energy level is selected as the second terminal device.

In an embodiment, the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

In an embodiment, the operational characteristic is a user selection indicator, the value of the operational characteristic for each respective terminal device being indicative of whether or not that terminal device has been selected, and wherein a terminal device which has been selected by the user is selected as the second terminal device.

In an embodiment, the relay node establishment signalling received by the transceiver is indicative of the selected second terminal device, and the controller is operable to establish, as the second terminal device, the terminal device indicated by the relay node establishment signalling.

In an embodiment, the relay node establishment signalling received by the transceiver is indicative of the value of the operational characteristic associated with the first terminal device as determined by the first terminal device and the value of the operational characteristic associated with each of the other terminal devices as received by the first terminal device, and the controller is operable to select the second terminal device on the basis of the value of the operational characteristic associated with each of the terminal devices and to establish the selected terminal device as the second terminal device.

In an embodiment, the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein when the operational characteristic is indicative of the ability of each terminal device to act as a control plane relay node via which each of the other terminal devices is operable to exchange control plane signalling with at least one of the base stations, the relay node establishment signalling provides an indication that one of the terminal devices should be established as the control plane relay node, and the controller is operable to perform an operation to establish, on the basis of the received relay node establishment signalling, the terminal device to act as the control plane relay node, wherein the terminal device to act as the control plane relay node is selected on the basis of the values of the operational characteristic associated with each of the terminal devices; when the operational characteristic is indicative of the ability of each terminal device to act as a user plane relay node via which each of the other terminal devices is operable to exchange user plane data with at least one of the base stations, the relay node establishment signalling provides an indication that one of the terminal devices should be established as the user plane relay node, and the controller is operable to perform an operation to establish, on the basis of the received relay node establishment signalling, the terminal device to act as the user plane relay node, wherein the terminal device to act as the user plane relay node is selected on the basis of the values of the operational characteristic associated with each of the terminal devices.

In a third aspect, the present technique provides a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein: a first terminal device of the terminal devices is operable to determine a value of a operational characteristic associated with the first terminal device and to receive, from each of the other terminal devices, a value of the operational characteristic associated with each of the other terminal devices; and a controller of the wireless telecommunications system is operable to perform, on the basis of relay node establishment signalling received from the first terminal device at a first one of the base stations, an operation to establish a second terminal device of the terminal devices as a relay node via which each of the other terminal devices is operable to communicate with at least one of the base stations, wherein the relay node establishment signalling provides the first one of the base stations with an indication that a second terminal device should be established as a relay node via which each of the other terminal devices is operable to communicate with at least one of the base stations, and wherein the second terminal device established as the relay node is selected on the basis of the value of the operational characteristic associated with the first terminal device and the values of the operational characteristic associated with the other terminal devices received by the first terminal device from the other terminal devices.

In an embodiment, the wireless telecommunication system comprises at least two base stations each operable to use a different radio access technology (RAT) to each other; and at least two of the terminal devices in the plurality of terminal devices are operable to exchange signalling with a respective one of the at least two base stations using the RAT associated with that base station when acting as a relay node.

In an embodiment, prior to establishment of the second terminal device as a relay node, the first terminal device is a relay node.

In an embodiment, the operational characteristic is a radio channel condition of a radio communication channel between each respective terminal device and at least one of the base stations, and the terminal device with the best radio channel condition is selected as the second terminal device.

In an embodiment, the operational characteristic is a radio channel condition of a radio communication channel between each respective terminal device and each of the other terminal devices, and the terminal device with the best radio channel condition is selected as the second terminal device.

In an embodiment, the operational characteristic is a predetermined capability of each terminal device, and the terminal device with the most favourable predetermined capability is selected as the second terminal device.

In an embodiment, the operational characteristic is a battery energy level of each terminal device, and the terminal device with the highest battery energy level is selected as the second terminal device.

In an embodiment, the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

In an embodiment, the operational characteristic is a user selection indicator, the value of the operational characteristic for each respective terminal device being indicative of whether or not that terminal device has been selected, and wherein a terminal device which has been selected by the user is selected as the second terminal device.

In an embodiment, the second terminal device is selected by the first terminal device and the relay node establishment signalling transmitted to the first one of the base stations by the first terminal device is indicative of the selected second terminal device.

In an embodiment, the second terminal device is selected by the controller of the wireless telecommunications system and the relay node establishment signalling transmitted to the first one of the base stations by the first terminal device is indicative of the value of the operational characteristic associated with each of the terminal devices.

In an embodiment, the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; when the operational characteristic is indicative of the ability of each terminal device to act as a control plane relay node via which each of the other terminal devices is operable to exchange control plane signalling with at least one of the base stations, the relay node establishment signalling provides an indication that one of the terminal devices should be established as the control plane relay node, and the controller of the wireless telecommunications system is operable to perform an operation to establish, on the basis of the received relay node establishment signalling, the terminal device to act as the control plane relay node, wherein the terminal device to act as the control plane relay node is selected on the basis of the values of the operational characteristic associated with each of the terminal devices; and when the operational characteristic is indicative of the ability of each terminal device to act as a user plane relay node via which each of the other terminal devices is operable to exchange user plane data with at least one of the base stations, the relay node establishment signalling provides an indication that one of the terminal devices should be established as the user plane relay node, and the controller of the wireless telecommunications system is operable to perform an operation to establish, on the basis of the received relay node establishment signalling, the terminal device to act as the user plane relay node, wherein the terminal device to act as the user plane relay node is selected on the basis of the values of the operational characteristic associated with each of the terminal devices.

In a fourth aspect, the present technique provides a method of operating a first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, the method comprising: determining a value of an operational characteristic associated with the first terminal device; and controlling a transceiver unit of the first terminal device to receive, from each of the other terminal devices, signalling indicative of a value of the operational characteristic associated with that terminal device; wherein the transceiver unit is controlled to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected on the basis of the determined value of the operational characteristic associated with the first terminal device and the values of the operational characteristic associated with the other terminal devices as received by the transceiver unit from the other terminal devices.

In a fifth aspect, the present technique provides a method of operating a base station for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, the method comprising: controlling a transceiver of the base station to receive relay node establishment signalling from a first one of the terminal devices, the relay node establishment signalling providing an indication that a second one of the terminal devices should be established as a relay node via which each of the other terminal devices is operable to communicate with at least one of the base stations; and performing an operation to establish, on the basis of the received relay node establishment signalling, a second one of the terminal devices as a relay node via which each of the other terminal devices is operable to communicate with at least one of the base stations, wherein the second terminal device established as the relay node is selected on the basis of a value of an operational characteristic associated with the first terminal device as determined by the first terminal device and a value of the operational characteristic associated with each of the other terminal devices as received by the first terminal device from each of the other terminal devices.

In a sixth aspect, the present technique provides a method of operating a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein a first terminal device of the terminal devices is operable to determine a value of a operational characteristic associated with the first terminal device and to receive, from each of the other terminal devices, a value of the operational characteristic associated with each of the other terminal devices, the method comprising: performing, on the basis of relay node establishment signalling received from the first terminal device at a first one of the base stations, an operation to establish a second terminal device of the terminal devices as a relay node via which each of the other terminal devices is operable to communicate with at least one of the base stations, wherein the relay node establishment signalling provides the first one of the base stations with an indication that a second terminal device should be established as a relay node via which each of the other terminal devices is operable to communicate with at least one of the base stations, and wherein the second terminal device established as the relay node is selected on the basis of the value of the operational characteristic associated with the first terminal device and the values of the operational characteristic associated with the other terminal devices received by the first terminal device from the other terminal devices.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF DRAWINGS

Embodiments of the present disclosure will now be described by way of example only with reference to the accompanying drawings wherein like parts are provided with corresponding reference numerals and in which.

DESCRIPTION OF EXAMPLE EMBODIMENTS

Figure 1:
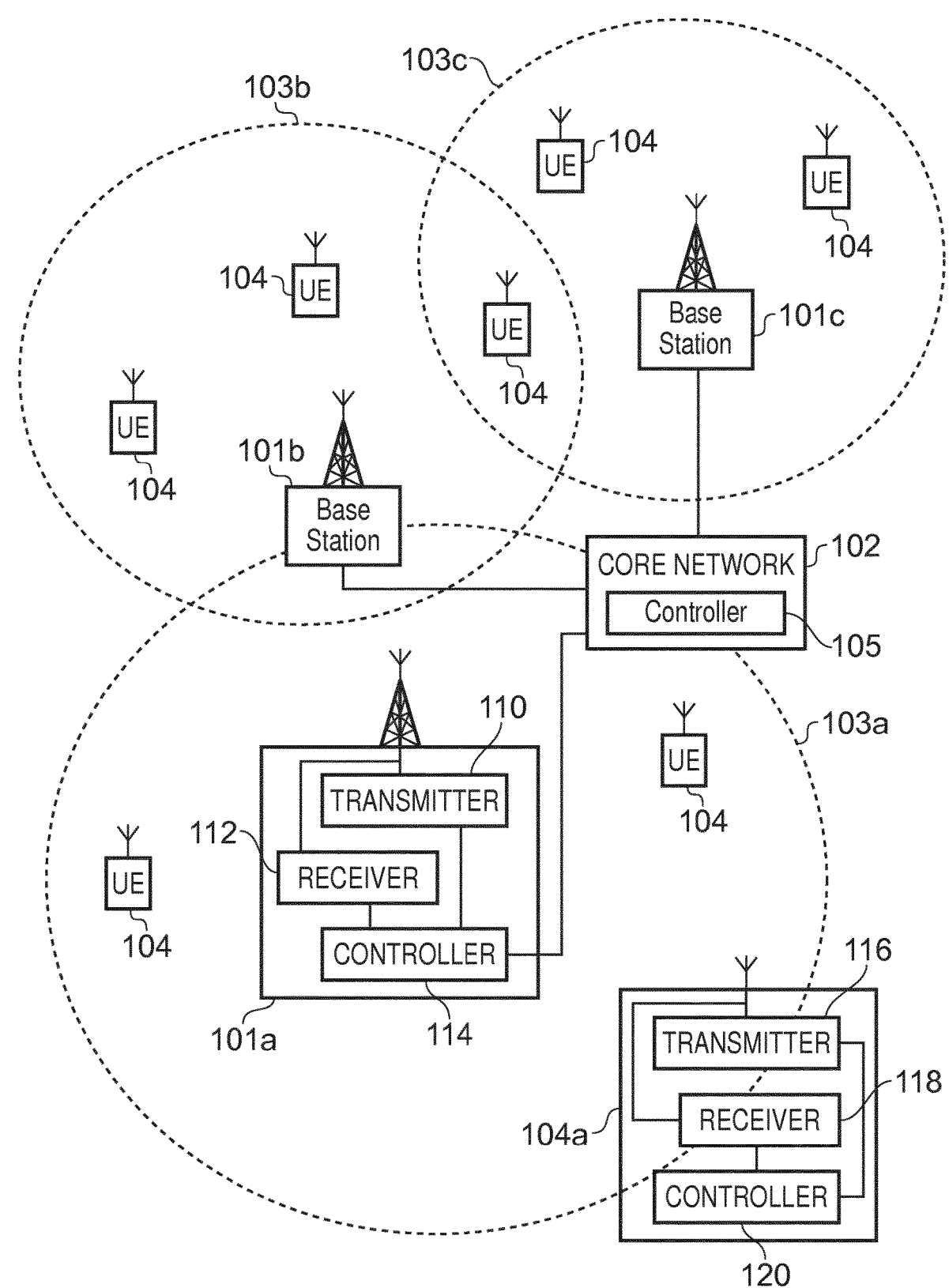
FIG. 1 provides a schematic diagram of a wireless telecommunications system.

FIG. 1 provides a schematic diagram illustrating the functionality of a wireless telecommunications system, according to an embodiment of the present technique. The wireless telecommunications system may operate in accordance with any suitable known telecommunications technology, such as Long Term Evolution (LTE), Universal Mobile Telecommunications System (UMTS) or Global System for Mobile Communications (GSM). Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

FIG. 1 provides a schematic diagram of a wireless telecommunications system, where the system includes infrastructure equipment 101a-c which are connected to a core network 102, which operates in accordance with a conventional arrangement which will be understood by those acquainted with communications technology. Each of the infrastructure equipment 101a-c may also be referred to as a base station, network element, infrastructure apparatus, enhanced Node B (eNodeB or eNB) (in the case of LTE infrastructure equipment) or a coordinating entity for example, and provides a wireless access interface to the one or more communications devices 104 within a respective coverage area or cell represented by broken lines 103a-c. One or more mobile communications devices 104 may communicate data via the transmission and reception of signals representing data using the wireless access interface. The core network 102 may also provide functionality including authentication, mobility management, charging and so on for the communications devices 104. The core network 102 comprises a controller 105 for providing this functionality.

The mobile communications devices 104 of FIG. 1 may also be referred to as communications terminals, user equipment (UE), terminal devices and so forth, and are configured to communicate with one or more other communications devices served by the same or a different coverage area via the core network 102. These communications may be performed by transmitting (on an uplink) and receiving (on a downlink) signals representing data using the wireless access interface provided by the base stations 101a-c.

The wireless communications system may operate in accordance with at least one of any known protocols, for example, LTE, UMTS or GSM. In particular, the system may operate in accordance with a plurality of different protocols simultaneously. For example, base station 104a may operate in accordance with LTE, base station 104b may operate in accordance with UMTS and base station 104c may operate in accordance with GSM. In this case, a terminal device 104 will need to communicate with the core network 102 via LTE when in the coverage area 103a of base station 101a, UMTS when in the coverage area 103b of base station 101b, and GSM when in the coverage area 103c of base station 101c. When in an overlapping coverage area, a terminal device will be able to communicate with the core network 102 using the base station associated with either of the overlapping coverage areas. Thus, for example, if a terminal device 104 is in the overlapping area of coverage areas 103a and 103b in FIG. 1, then it may communicate with the core network 102 using either base station 101a (using LTE) or base station 101b (using UMTS). Similarly, if a terminal device 104 is in the overlapping area of coverage areas 103b and 103c in FIG. 1, then it may communicate with the core network 102 using either base station 101b (using UMTS) or base station 101c (using GSM). The use of multiple, different protocols in the wireless telecommunications system gives the opportunity for a particular terminal device 104 to communicate with the core network 102 even if that terminal device 104 is only configured to use a subset of the protocols available on the network (for example, the terminal device 104 may be an LTE-only device or a GSM- and UMTS-only device). Embodiments of the present technique further extend this possibility, as will be discussed later on.

It is noted that although each of the base stations 101a-c are shown as being in different respective geographical locations, it will be appreciated that at least a portion of the base stations may be located at the same geographical location. It will also be appreciated that a single base station may be configured to use a plurality of different protocols simultaneously (for example, UMTS and LTE). In this case, the single base station therefore, in effect, performs the role of a plurality of separate base stations positioned at the same geographical location (for example, a base station with joint UMTS and LTE capability is equivalent to separate base stations 101a and 101b being positioned at the same geographical location). In either case, such an arrangement allows a terminal device 104 within coverage of such base station(s) to communicate with the core network via either protocol available in the coverage area.

As shown in FIG. 1, one of the base stations 101a is shown in more detail to include a transmitter 110 for transmitting signals via a wireless access interface to the one or more communications devices or UEs 104, and a receiver 112 to receive signals from the one or more UEs within the coverage area 10a. A controller 114 controls the transmitter 110 and the receiver 112 to transmit and receive the signals via the wireless access interface associated with the base station. The controller 114 may perform a function of controlling the allocation of communications resource elements of the wireless access interface and may in some examples include a scheduler for scheduling transmissions via the wireless access interface for both the uplink and the downlink. Each of the other base stations in the wireless telecommunication system has the same structure as that shown for base station 101a.

An example UE 104a is shown in more detail to include a transmitter 116 for transmitting signals on the uplink of the wireless access interface to the base station 101a and a receiver 118 for receiving signals transmitted by the base station 101a on the downlink via the wireless access interface. The transmitter 116 and the receiver 118 are controlled by a controller 120. Each of the other terminal devices 104 in the wireless telecommunications system have the same structure as that shown for terminal device 104a.

In an embodiment of the present technique, two or more terminal devices are paired using a common device to device radio technology. As previously mentioned, LTE D2D is an example of such a radio technology. However, with embodiments of the present technique, this concept is extended so that other radio technologies could also be used to establish a common interface between two devices and to thus pair those devices. For example, standalone LTE-U (LTE in unlicensed spectrum), a 5G ($5^{th}$ generation mobile networks) device-to-device protocol, Bluetooth or Wi-Fi direct could be used. The paired devices (which form a group) then combine radio access network capabilities, and share measurements of their supported radio access technologies (RATs, such as LTE, UMTS and GSM) via the common interface. The mobility of the group of devices depends on the measurements of the group, as if it were one device. UEs in the group access the network via one device which is currently connected to the network. Such an arrangement is exemplified in FIG. 2.

Figure 2:
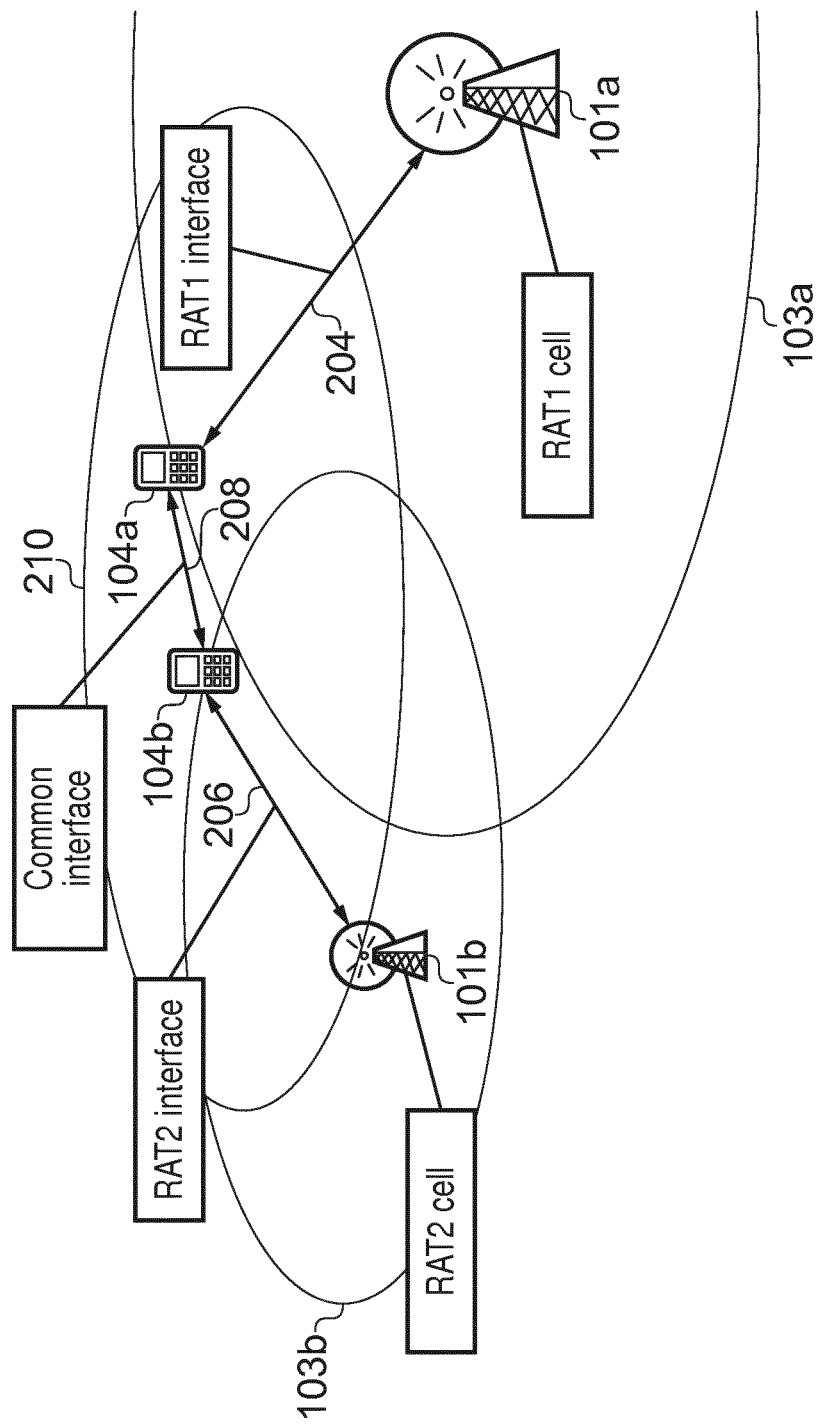
FIG. 2 schematically illustrates base stations and terminal devices of the wireless telecommunications system, wherein the two terminal devices are paired via a common interface.

FIG. 2 schematically illustrates the base station 101a (which is configured to perform wireless communication with terminal devices using a first RAT) and the base station 101b (which is configured to perform wireless communication with terminal devices using a second RAT), together with two terminal devices 104a and 104b. The two terminal devices 104a and 104b are paired via a common interface 208 (such as an LTE D2D, LTE-U, 5G, Bluetooth or Wi-Fi direct interface), as previously described. The terminal device 104a is configured to perform wireless communication with the base station 101a using the first RAT (via first RAT interface 204) and the terminal device 104b is configured to perform wireless communication with the base station 101b using the second RAT (via second RAT interface 206). Furthermore, because of the common interface 208 pairing the two terminal devices 104a and 104b, it is possible for both terminal devices to communicate with the core network via a single one of the base stations 101a and 101b. Thus, both terminal devices may communicate with the core network via base station 101a, in which case communications between the terminal device 104b and the base station 101a occur via the terminal device 104a, which acts as a relay node. Alternatively, both terminal devices may communicate with the core network via base station 101b, in which case communications between the terminal device 104a and the base station 101b occur via the terminal device 104b, which acts as a relay node.

The arrangement exemplified in FIG. 2 allows improved flexibility and reliability of the wireless telecommunications system. For example, if a signal strength and/or quality of the first RAT interface 204 is lower than that of the second RAT interface 206, then it may be beneficial for the terminal device 104a to perform communication with the core network via terminal device 104b and the higher strength and/or quality second RAT interface 206 than to perform communication directly with the base station 101a via the first RAT interface 204. Similarly, if a signal strength and/or quality of the second RAT interface 204 is lower than that of the first RAT interface 206, then it may be beneficial for the terminal device 104b to perform communication with the core network via terminal device 104a and the higher strength and/or quality first RAT interface 206 than to perform communication directly with the base station 101b via the second RAT interface 204.

As a further example, the arrangement as exemplified in FIG. 2 may allow a terminal device 104 to communicate with the core network using a RAT which the terminal device 104 is not configured to use directly. For example, consider a scenario in which the first RAT interface 204 is an LTE interface, the second RAT interface 206 is a UMTS interface, the terminal device 104a is configured to use only an interface for performing communication with a base station, and the terminal device 104b is configured to use only a UMTS interface for communication with a base station. In this case, it will not normally be possible for the terminal device 104a to communicate with the core network using the second RAT interface 206, even if the signal strength and/or quality associated with the second RAT interface 206 is better than the signal strength and/or quality associated with the first RAT interface 204. However, with the arrangement exemplified in FIG. 2, such a scenario is possible, since the terminal device 104a is able to communicate with the core network via the terminal device 104b (which can perform communication using the second RAT interface 206). The converse situation also applies. That is, if the signal strength and/or quality associated with the first RAT interface 204 is better than the signal strength and/or quality associated with the second RAT interface 206, then the terminal device 104b is able to communicate with the core network via the terminal device 104a, thus allowing communication with the core network via the first RAT interface 204 even though the terminal device 104b cannot use the first RAT interface 204 directly.

It will thus be appreciated that each of the first and second RAT interfaces may be the same. Alternatively, each of the first and second RAT interfaces may be different. Each of the terminal devices may support the same RAT. Alternatively, the terminal devices may each support a different RAT (in addition to the common interface radio technology). In this case, a first terminal device may support a first RAT (say, LTE) and a second terminal device may support a second RAT (say, 5G). The first terminal device supporting LTE can connect to a 5G cell via the second terminal device (via the common interface) and vice-versa. Whichever the scenario, the terminal device with the best radio channel conditions (as indicated by signal strength and/or quality, for example), or as selected in accordance with the particular application or situation, can allow connection of the group of terminal devices to the network. Further examples of the present technique (which help illustrate possible applications and situations of the above-described arrangements) are described below.

In one example, a user has a low-cost LTE smart watch (this being a first terminal device) and a high-end LTE/UMTS/GSM/Wi-Fi mobile phone (this being a second terminal device). The devices are paired via a common interface (such as Bluetooth). Depending on the circumstances, either the phone or the watch could maintain the connection with the network. Devices share measurement information and capabilities via the common interface.

In the case of no LTE coverage, or in case of no support for a reduced bandwidth low-cost LTE device, the phone would maintain the network connection.

In the case of the user going into a location with poor radio conditions (such as a basement), the watch may take over maintaining the network connection using low-cost LTE coverage enhancement. This alleviates the need for the phone to ramp up its power output in order to maintain the network connection (thus reducing power consumption of the phone and preserving battery life) whilst, at the same time, allowing a minimum Quality of Service (QoS) to be provided.

In the case of the phone entering a low power sleep mode, the watch may take over responsibility of monitoring paging, thus allowing the phone to switch off its cellular operations altogether (again reducing power consumption of the phone and preserving battery life). Once paged, the watch can wake up the phone (via signalling transmitted over the common interface) and a call can be transferred to the phone (in this case, for example, initial signalling may be performed by the watch, which then transfers the radio network temporary identifier (RNTI) to the phone).

In general, with embodiments of the present technique, operations such as cell reselection and handover can take into account the capabilities and radio conditions of all terminal devices grouped via a common interface. For example, when circumstances dictate that it is beneficial to do so, a reselection from a narrowband LTE cell to a UMTS cell by changing the terminal device which maintains the network connection from the watch to the phone may be carried out. In this sense, the connection between the group comprising the watch and the phone and the network is maintained using the most suitable one of the watch and phone as the relay node (a relay node may also be referred to as a master device or master node) and the most suitable terminal device to base station RAT interface. The most suitable relay node and/or RAT interface is determined based on predetermined circumstantial factors (operational characteristics), such as the capability of each of the watch and phone (the capability being defined by, for example, which types of RAT interface each of the watch and phone are configured to use, and/or the rate at which each of the watch and phone can process data) and the radio conditions associated with each of the watch and phone. Examples of possible circumstantial factors are discussed in more detail later on.

Figure 3:
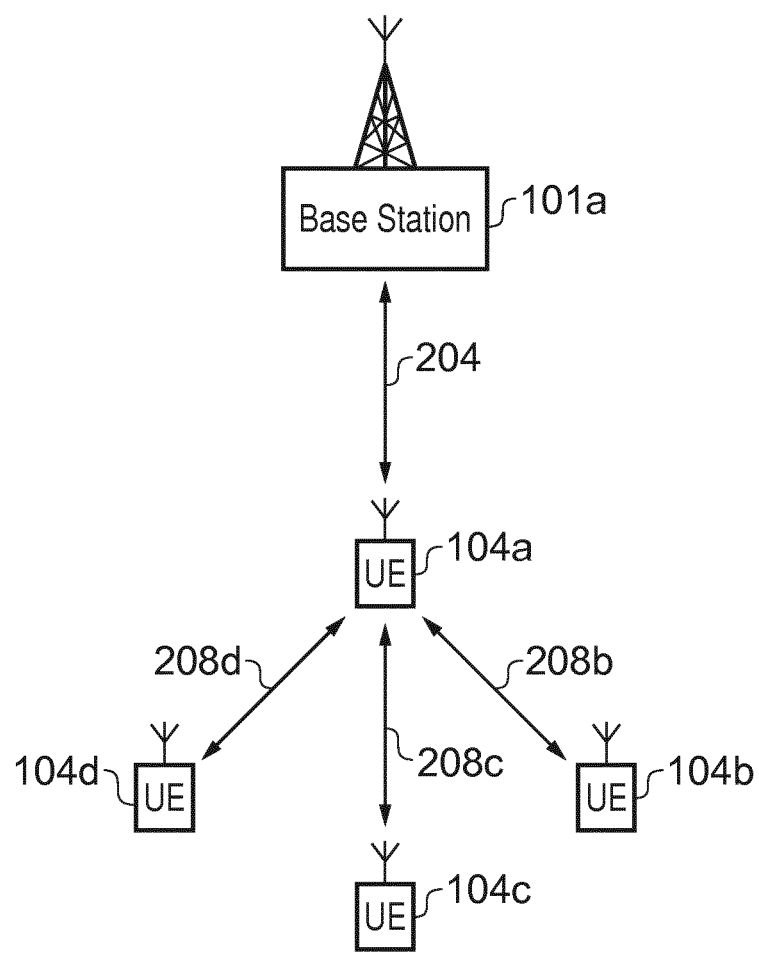
FIG. 3 schematically illustrates a group of terminal devices linked by a plurality of common interfaces.

It will be appreciated that although the examples given so far include only two terminal devices grouped together via a common interface, the present disclousre is not limited to this, and there may be more than two terminal devices in a group. In this case, each of the terminal devices forms a common interface with at least one other terminal device such that there is a communication path between each terminal device in the group and every other terminal device in the group. Such an arrangement is schematically shown in FIG. 3, in which a group comprises four terminal devices 104a-d. In this group, terminal device 104a maintains a connection with the network via a given RAT interface 204 (such as LTE) and each of the other terminal devices 104b, 104c and 104d maintains a respective common interface 208b, 208c and 208d with the terminal device 104a. Thus, the terminal device 104a acts as a relay node via which each of the terminal devices 104b, 104c and 104d is able to communicate with the network. It will be appreciated that further terminal devices could be added to the group, and that the common interfaces between terminal devices in the group could be arranged differently. For example, the terminal device 104d could have a common interface with terminal device 104c instead of having a common interface with terminal device 104a. Assuming that all the other common interfaces of FIG. 3 remain unchanged, the terminal device 104d may thus still communicate with the network, but this will have to occur via both terminal device 104c and terminal device 104a (thus, in a sense, both terminal devices 104c and 104a act as relay nodes). It will be appreciated that any configuration of common interfaces (including the number of common interfaces that exist and which specific terminal devices are connected by each common interface) could be used, as long as a communicaiton path can be established (using one or more of the other terminal devices as additional relay nodes, if necessary) between each terminal device in the group and the network.

A group comprising more than two terminal devices is exemplified by a car having, for example, a 5G+LTE modem with a MIMO (multiple-input multiple-output) antenna. Several passengers may then connect user devices to the 5G+LTE modem of the car (the modem thus acting as a so-called network "hotspot") using a common interface implemented using, for example, standalone LTE-U or another technology (including those not yet defined in 3GPP). The user devices may be, for example, mobile phones or tablet computers also supporting UMTS/GSM. In this case, the terminal devices making up the group include the modem of the car and each user device. Initially, in an area with sufficient 5G and/or LTE coverage (such as urban areas in which 5G and/or LTE has been rolled out), the car modem will act as a relay node, thus providing each user device with a relayed 5G and/or LTE connection to the network. On the other hand, when the car moves from the city into a rural area (with no or limited 5G and/or LTE reception but with sufficient UMTS and/or GSM reception), one of the user devices may then take over the connection to the network (using UMTS or GSM, for example). That is, one of the user devices becomes the relay node via which all the other devices in the group communicate with the network. In this case, new common interfaces may be established between the user device newly selected as the relay node and each of the other user devices. Alternatively, the previous common interface between each user device and the car modem may be maintained, and all communication between the relay node user device and each other user device then occurs via the car modem. At a later point, when sufficient LTE and/or 5G coverage becomes available, the car modem may once again become the relay node via which each of the user devices connects to the network.

As previously mentioned, the terminal device within a group of terminal devices which is selected as the relay node for maintaining the group connection to the network may be selected on the basis of one or more predetermined factors. One such factor is the radio channel conditions (as indicated by signal strength and/or quality, for example) of the radio channel between each terminal device in the group and the network, so that the terminal device with the most favourable radio channel conditions (as indicated by highest signal strength and/or quality, for example) is selected as the relay node. In order to determine which terminal device has the most favourable radio channel conditions, the radio channel conditions of each terminal device in the group must be measured and compared. In one example, each terminal device measures its own radio signal conditions, and then provides the measurement to one of the terminal devices which has been selected as a management device. Any one of the terminal devices in the group may be selected as the management device. However, in particular, the current master device (relay node) may be chosen because it is likely that all the other terminal devices already have a direct common interface with the master device and thus are able to quickly provide their respective measurement reports. Alternatively it may be the device with the highest data processing capability, since this would allow the processing of the measurements results to be completed most quickly. During measurement, each device will, for example, evaluate its own network RAT measurements (for each RAT that the device is configured to use) and provide the result(s) to the management device. Due to the need to compare radio channel conditions for different RATs, it may be necessary for the measurement for each RAT to be converted to a common format so as to allow the radio channel conditions of each RAT to be compared (thus, for example, converting reference signal received power (RSRP) in LTE, received signal code power (RSCP) in UMTS, etc. into a common value type so that the radio channel conditions indicated by the RSRP, RSCP, etc. can be directly compared). This conversion may be carried out by the management device once each of the RAT specific radio channel condition measurements have been received. Alternatively, this conversion may be carried out by each device once it has completed its own measurement(s), so that it is the common format values which are then transmitted to the management for comparison. Such an arrangement thus spreads the required comparison processing between each of the devices in the group, resulting in more efficient evaluation processing. A given RAT measurement may be converted to the common format using a lookup table or the like (the lookup table would allow each possible value of each possible RAT measurement type (such as RSRP, RSCP, etc.) to be associated with a corresponding value in the common format).

In an embodiment, the common format results provided by the terminal devices will include different levels of link quality measurements. That is, each terminal device will provide a measurement for each of the RATs it is configured to use, regardless of whether the measurement associated with a particular RAT indicates that the radio conditions associated with that RAT are good or bad. So, for example, if a particular terminal device is configured to communicate with the network using LTE or UMTS, then measurements for both LTE and UMTS would be taken and provided to the management device, regardless of the value of those measurements. Thus, the measurement results provided by each terminal device contain not only the good link measurement results, but also the bad link measurement results. This allows a full subsequent evaluation of the radio channel conditions associated with each terminal device. The terminal device and network RAT interface with the most favourable radio channel conditions may then be selected as the relay node.

Instead of or in addition to measurements of the radio channel conditions, the evaluation of which device should be used as the relay node may be based on one or more other factors. Examples of such factors are discussed below.

One factor is the radio channel conditions of the common interface between each terminal device and each of the other terminal devices. A device that has good radio channel conditions on the channel between itself and the network (implemented, for example, via an LTE interface) may have poor channel conditions on the common interface which allow it to send and receive data to each of the other devices in the group. Hence, it may be preferable to hand over to a new relay node in the group that has worse channel conditions on the channel between itself and the network, but better conditions on the common interface. Selecting the relay node based on this factor will require radio channel condition measurements of the common interface used for each device in addition to radio channel condition measurements of the various RAT interfaces of each device with the network. This way, if, for a particular device, the channel conditions of a particular RAT interface with the network (otherwise referred to as channel conditions of the wide area network (WAN)) are measured to be very favourable, but the channel conditions of the common interface for that device are not measured to be very favourable, then it may be better to select a different device with slightly worse WAN channel conditions but much better common interface channel conditions as the relay node. The WAN channel conditions and common interface channel conditions of each terminal device will need to be measured and evaluated in order to determine whether or not this is the case. As an example, a terminal device that is central to a group of terminal devices might have good common interface connections to all the other terminal devices, but a terminal device that is at the edge of the group might have poor (or no) common interface connections to terminal devices at the opposite edge of the group. A terminal device at the edge of the group may thus be an unsuitable choice for the relay node, even if the WAN channel conditions for that terminal device are favourable.

Another factor is the capability of a terminal device in terms of data processing and/or data transmission and reception. A higher throughput connection to the WAN may be obtained using a relay node that has a higher capability (that is, able to process and/or transmit and receive data at a higher rate, such as an LTE category 10 device) and relatively poor channel conditions rather than a lower capability relay node (that is, able to process and/or transmit and receive data only at a lower rate, such as an LTE category 1 device) enjoying better channel conditions. Hence, a relay node may be selected based on achievable data rate rather than or in addition to direct channel measurements. Other factors which may be taken into account when considering the capability of a given terminal device are, for example, whether or not the terminal device is capable of supporting MIMO (in which case, a terminal device which does support MIMO may be a more favourable relay node), or whether not a given terminal device is capable of carrier aggregation (in which case, a terminal device which does support carrier aggregation may be a more favourable relay node). In general, the term capability (or predetermined capability) should be understood to refer to a device's ability to process data and/or exchange data with another device.

Another factor is the suitability of the WAN channel of a terminal device for advanced transmission modes. For example, a terminal device may have relatively poor WAN channel conditions (in terms of, say, RSRP measured from common reference signals), but may nonetheless have WAN channel conditions that are appropriate for more advanced transmission modes such as MIMO transmission techniques.

Such a terminal device may thus potentially achieve higher data rates than another terminal device with better WAN channel conditions but which does not support more advanced transmission techniques, thus making it a more suitable relay node.

Another factor relates to battery status. A terminal device with a depleted battery may be experiencing good channel conditions, but electing that terminal device as a relay node may not be a good idea as it would lead to the terminal device running out of battery energy more quickly. Thus, when determining a terminal device for use as a relay node, the battery status of each terminal device may be determined and evaluated. Then, only a terminal device with a battery energy level which is, for example, above a predetermined threshold may be selectable as a relay node.

Another factor is the financial cost of WAN data communication of each terminal device in the group. Usually, each terminal device which uses a WAN network via a RAT interface must pay financial charges to a provider of the network. The financial charges may be different for each terminal device in a group, depending on the user's contract or price plan with the network provider. Thus, for terminal devices in the group with different price plans, the cost of WAN data communication may be different for each of these terminal devices. Different RAT interfaces may also be associated with different price plans, so that the cost associated exchanging data over, for example, LTE is different to the cost associated with exchanging data over UMTS. For example, a price plan may include unlimited data exchange on LTE, £1 per minute of data for UMTS and £2 per minute of data for EGPRS. The choice of a relay node may then be chosen as an optimisation between WAN link speed and cost.

Another factor is user control. That is, a user may select one device to be a preferred relay node, or may select other devices to be non-preferred relay nodes. In this sense, a user is thus able to override any automatic process for selecting a relay node based on, for example, one or more of the above-mentioned factors.

In one embodiment, the processing of information indicative of one or more of the various factors used to decide on an appropriate relay node is carried out by the management device. Thus, each of the other terminal devices transmits such information (relating to, for example, WAN radio channel conditions, capability, whether or not advanced transmission modes are supported, battery status, financial cost of WAN data exchange and/or user control data) to the management device via its respective common interface. The controller 120 of the management device then evaluates the received information and determines a suitable one of the terminal devices to act as a relay node based on this evaluation. Information indicative of the determined terminal device is then transmitted to the network (as relay node establishment signalling), which then carries out a suitable process for establishing the determined terminal device as a relay node.

In an alternative embodiment, the management device collects the information from each of the other terminal devices, but does evaluate it. The collected information itself is then transmitted to the network (as relay node establishment signalling), and it is the network which evaluates the received information and determines a suitable one of the terminal devices to act as a relay node. The network then establishes the determined terminal device as a relay node. In this alternative embodiment, some of the information required for selecting a suitable relay node may already be known to the network. For example, if the financial cost of data is a factor used in deciding which of the terminal devices in a given group would be the most suitable relay node (as previously discussed), then this information (that is, the financial cost information) is likely to already be known by the network. The need for each of the terminal devices to transmit this information to the management device and for the management device to then, in turn, transmit this information to the network is thus alleviated, reducing network data usage.

It will be appreciated that, in either of the above mentioned scenarios (that is, the first scenario in which the management device performs evaluation based on the information received from the other terminal devices, and the second scenario in which the management device transmits the information received from the other terminal devices to the network without performing evaluation), the management device will also take into account its own information (relating to, for example, WAN radio channel conditions, capability, whether or not advanced transmission modes are supported, battery status, financial cost of WAN data exchange and/or user control data of the management device). This is because it may be the case that the management device itself is the most suitable relay node.

It is noted that, in order to take into account temporal changes to the wireless telecommunications system (resulting from, for example, mobility of the terminal devices in the group and/or changes to radio signal conditions), each of the terminal devices in the group will continuously or periodically provide updated information to the management device. Updated information may also be provided to the management device by a terminal device when that terminal device detects a change in a particular measurement (such as a measurement of radio signal conditions), or if such a change exceeds a certain predetermined change threshold. This allows the selected relay node to be changed, as appropriate, over time.

It is noted that the various operations of the network described above (such as the evaluation of information to determine a suitable one of the terminal devices to act as relay node and the processing carried out to actually establish a given terminal device as a relay node) are carried out by, for example, the controller 105 of the core network 102, the controller 114 of one of more of the base stations and/or the controller 120 of one or more of the terminal devices.

It is noted that a relay node for a group is initially chosen following, for example, the formation of a group. Thus, for instance, when two terminal devices initially establish a common interface (in response to operations carried out by the users of those devices, such as a Bluetooth or Wi-Fi direct pairing process, for example), one of the terminal devices in the pair is selected as a relay node based on the techniques described above. The terminal device which operates as the relay node may then be changed as information reported by each of the terminal devices changes (for example, the WAN radio conditions of the terminal device which originally acts as the relay node may get worse and the WAN radio conditions of the other terminal device may get better, thus making this other terminal device a more suitable relay node) and/or as terminal devices join or leave the group (for example, if a new terminal device joins the group and has better WAN radio conditions than either of the original two terminal devices, then this new terminal device may become the most suitable relay node).

When selection of a new relay node requires handing over between different RATS (for example, the previous relay node may have used UMTS, where as the new relay node may use LTE), an analogous process as used for a single device may be performed. For example, for an inter-RAT handover from UMTS to LTE, the UMTS terminal device connected to the UMTS cell will provide a measurement report to the network containing results for LTE cells (such as the RSRP of each LTE cell in range) as measured by the LTE terminal device and transmitted to the UMTS device via the common interface. Handover preparation signalling is then performed by the network using conventional methods, and the handover command is issued to the UMTS terminal device. The UMTS device then conveys the configuration in the handover command to the LTE device via the common interface. The LTE device then performs random access on the configured LTE cell, and a handover complete message is sent to the network over LTE by the LTE device. The LTE device then becomes the new relay node.

On the other hand, when handing over to the same RAT (for example, an LTE to LTE or UMTS to UMTS handover), then the RNTI used by the source terminal device may be transferred to the target terminal device via the common interface (in the case that there is no handover to a different base station) or a similar arrangement to that described for handing over between different RATs may be implemented (in the case that there is handover to a different base station that uses the same RAT time). As an example of the latter case, consider an LTE to LTE handover from a source terminal device to a target terminal device in which a base station handover is also necessary. The source terminal device connected to the source LTE cell will provide a measurement report to the network containing results for LTE cells (such as the RSRP of each LTE cell in range) as measured by the target terminal device and transmitted to the source terminal device via the common interface. Handover preparation signalling is then performed by the network using conventional methods, and the handover command is issued to the source terminal device. The source device then conveys the configuration in the handover command to the target device via the common interface. The target device then performs random access on the configured LTE cell, and a handover complete message is sent to the network over LTE by the target terminal device. The target terminal device then becomes the new relay node In embodiments, there are several types of handover that can occur.

Firstly, there is single terminal device handover. In this case, the terminal device which is used as the relay node does not change. However, the base station with which the terminal device communicates with the network does change (for example, as the relay node moves from the coverage area of one base station to the coverage area of another base station).

Secondly, there is group handover, in which the role of relay node is changed from one terminal device in the group to another based on one or more predetermined factors, as previously discussed.

Thirdly, there is group split handover. In this scenario, a first portion of the terminal devices in the group continue to communicate with the network via a first relay node, whereas a second portion of the terminal devices in the group start to instead communicate with the network via a newly defined second relay node. This situation may occur, for example, when the first portion of terminal devices comprises the first relay node, and when the first portion of terminal devices becomes spatially separated from the second portion of terminal devices, resulting in the signal conditions of the common interface between each terminal device in the second portion of terminal devices and the first relay node becoming unfavourable. In this third scenario, the management device of the group and/or the network determines (from information indicative of the common interface signal conditions received from each of the other terminal devices, as previously described) when one or more of the terminal devices in the group have sufficiently poor signal conditions over their respective common interfaces with the first relay node so as to warrant the creation of a new, second relay node (these one or more terminal devices may be referred to as breakaway terminal devices). The management device and/or network then determines a terminal device from amongst these breakaway terminal devices to act as the second relay node. The second relay node is determined and established using the techniques as previously described, and the remaining breakaway terminal devices then disconnect from the first relay node and connect to the second relay node. The original group has thus been split, with the first portion of terminal devices forming a first group (communicating with the network via the first relay node) and the second portion of devices forming a second group (communicating with the network via the second relay node, which now establishes a direct connection with the network via a suitable RAT interface). This third scenario therefore provides even greater flexibility in selecting an appropriate relay node.

In one embodiment, it is envisaged that millimetre wave spectrum (that is, above 6 GHz spectrum) small cells could be used by the network, and that transmit diversity may therefore need to be taken into account. In particular, the connection to such small cells is unreliable for high speed terminal devices (such as those used in motor vehicles) and due to obstacles in the line of sight between the small cell base station and terminal device. There may therefore be a need for a connection between a group of terminal devices and multiple cells simultaneously. This may be achieved by having multiple communication channels between the terminal devices in the group and the network, wherein each communication channel allows communication with a different respective cell of the network. In one example, there are multiple relay nodes in the group, wherein each relay node establishes a communication channel to a different respective cell of the network. Communication between terminal devices in the group and the network may therefore occur via any one of the communication channels, so that if communication is not possible along one channel (due to terminal devices moving away at too high a speed or due to line of sight obstacles, for example), communication may still occur via one or more of the other channels.

Thus, according to an embodiment of the present technique, there is provided a first terminal device (for example, one of the terminal devices 104) for use in a wireless telecommunications system comprising one or more base stations (for example, base stations 101a-c) each forming a respective network node of the wireless telecommunications system and a plurality of terminal devices (for example, terminal devices 104), wherein each of the terminal devices is operable to be established as a relay node via which each of the other terminal devices is operable to communicate with at least one of the base stations.

The first terminal device comprises a controller (for example, controller 120) operable to determine a value of an operational characteristic associated with the first terminal device. The operational characteristic is a characteristic which can be used to determine a suitable relay node from amongst a plurality of potential relay nodes, and may be, for example, a radio channel condition (either a WAN radio channel condition or common interface radio channel condition), a predetermined device capability, whether or not advanced transmission modes are supported, battery status, financial cost of WAN data exchange and/or user control data, as previously discussed.

The first terminal device also comprises a transceiver unit (as formed, for example, by the combined operation of the transmitter 116 and receiver 118) operable to receive, from each of the other terminal devices, signalling indicative of a value of the operational characteristic associated with each of the other terminal devices. This signalling is received via the common interface(s) of the terminal devices. Thus, for a given operational characteristic, the first terminal device knows a value for itself and for each of the other terminal devices.

The transceiver unit of the first terminal device is also operable to transmit relay node establishment signalling to a first one of the base stations for allowing, on the basis of the relay node establishment signalling, establishment of a second terminal device as a relay node via which each of the other terminal devices is operable to communicate with at least one of the base stations. The relay node establishment signalling provides the first one of the base stations with an indication that a second terminal device should be established as a relay node via which each of the other terminal devices is operable to communicate with at least one of the base stations. The second terminal device is selected on the basis of the value of the operational characteristic associated with the first terminal device as determined by the controller of the first terminal device and the values of the operational characteristic associated with the other terminal devices as received by the transceiver unit of the first terminal device. The second terminal device which acts as the relay node may be the same as the first terminal device, or may be a different one of the terminal devices.

It will thus be appreciated that the transceiver unit allows signalling to be exchanged both with other terminal devices via a common interface (using LTE D2D, LTE-U, 5G, Bluetooth or Wi-Fi direct interface, for example, as previously discussed) and with at least one of the base stations (using LTE, UMTS or GSM, for example). It is noted that although separate components may be required for allowing such an arrangement (for example, the receiver 118 may comprise a Bluetooth receiver for receiving signalling from other terminal devices and a separate LTE receiver for receiving signalling from a base station, and the transmitter 116 may comprise a Bluetooth transmitter for transmitting signalling to the other terminal devices and a separate LTE transmitter for transmitting signalling to a base station), these separate transceivers will together form the defined transceiver unit.

Furthermore, according to another embodiment of the present technique, there is provided a base station (for example, one of base stations 101a-c) for use in a wireless telecommunications system comprising one or more base stations (for example, base stations 101a-c) each forming a respective network node of the wireless telecommunications system and a plurality of terminal devices (for example, terminal devices 104), wherein each of the terminal devices is operable to be established as a relay node via which each of the other terminal devices is operable to communicate with at least one of the base stations. The base station comprises a transceiver (as formed, for example, by the combined operation of the transmitter 110 and receiver 112) operable to receive relay node establishment signalling from a first one of the terminal devices. The relay node establishment signalling provides an indication that a second terminal device should be established as a relay node via which each of the other terminal devices is operable to communicate with at least one of the base stations. The base station also comprises a controller (for example, controller 114) operable to perform an operation to establish, on the basis of the received relay node establishment signalling, a second one of the terminal devices as a relay node via which each of the other terminal devices is operable to communicate with at least one of the base stations. The second terminal device established as the relay node is selected on the basis of a value of a operational characteristic associated with the first terminal device as determined by the first terminal device and a value of the operational characteristic associated with each of the other terminal devices as received by the first terminal device from each of the other terminal devices.

It will be appreciated that, in embodiments, the selection of the second terminal device may be performed by the controller 120 of the first terminal device. In this case, the selected second terminal device is indicated by the relay node establishment signalling. Alternatively, the selection of the second terminal device may be performed by the controller 114 of one or more of the base stations and/or the controller 105 of the core network 102. In this case, the relay node establishment signalling includes the value of the operational characteristic associated with the first terminal device as determined by the controller of the first terminal device and the values of the operational characteristic associated with the other terminal devices as received by the transceiver unit of the first terminal device, thus allowing selection of the second terminal device based on these values. It will further be appreciated that, in embodiments, the establishment of the second terminal device as the relay node is controlled by one or more controllers of the wireless telecommunications system, such as the controller 120 of the first and/or second terminal devices, controller 114 of one or more of the base stations and/or controller 105 of the core network 102.

It is noted that the establishment of the second terminal device as the relay node (either during initial establishment of a relay node or during handover between relay nodes) will often require the controller 120 of each of the terminal devices in the group, the controller 114 of each of the relevant base stations and/or the controller 105 of the core network 102 to work together and to exchange signalling with each other over the various communication channels in order for this establishment to be completed. Each terminal device in the group must know which terminal device is acting as the relay node (thus requiring control function from the controller 120 of each of the terminal devices). The relevant base station(s) must also know which terminal device is acting as the relay node, and which RAT is to be used (thus requiring control function from the controller 114 of each base station). Furthermore, the core network 102, through which all the base stations are connected and managed, may also need to monitor which terminal device is acting as the relay node (thus requiring control function from the controller 105 of the core network 102). In particular, control function from the controller 105 of the core network 102 is required when the base station is changed following establishment of a new relay node (for example, if the relay node is changed from a first LTE-only terminal device to a second UMTS-only terminal device).

Figure 4:
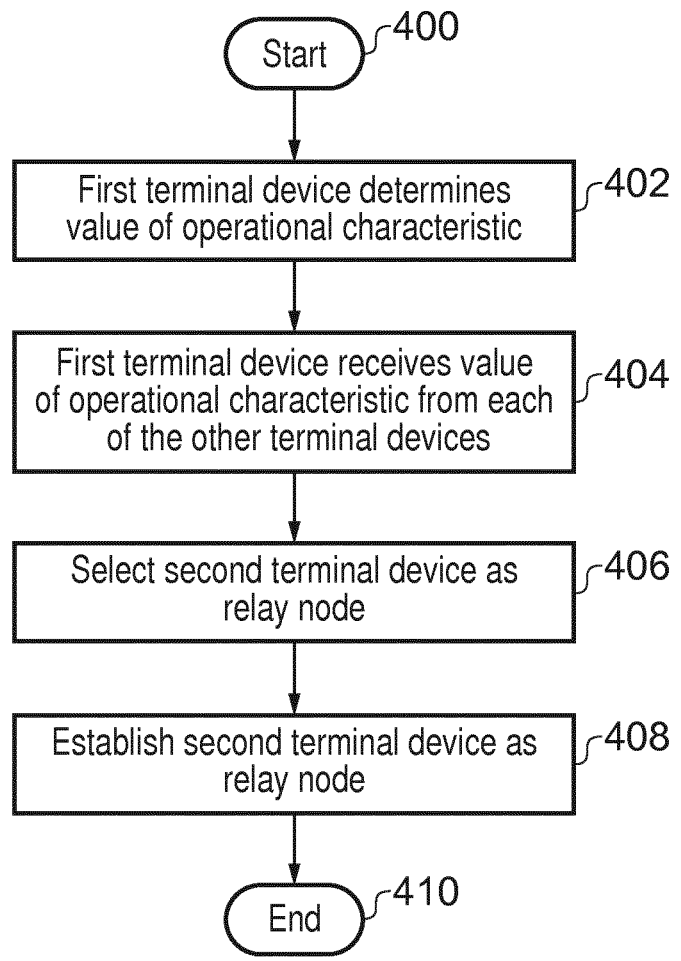
FIG. 4 shows a flow chart illustrating a process according to an embodiment of the present technique.

FIG. 4 shows a flow chart illustrating a process according to an embodiment of the present technique. The process starts at step 400. At step 402, a first terminal device determines a value of an operational characteristic associated with the first terminal device. At step 404, the first terminal device receives, from each of the other terminal devices, a value of the operational characteristic associated with each of the other terminal devices. At step 406, a second terminal device to be established as a relay node is selected on the basis of the value of the operational characteristic associated with the first terminal device and the values of the operational characteristic associated with the other terminal devices as received by the first terminal device. At step 408, the second terminal device is established as the relay node. The process then ends at step 410.

Thus, from the above description, it will be seen that the present technique provides several advantages. In particular, the present technique allows improved network coverage for a group of terminal devices, allowing the most favourable RAT and radio conditions to be selected. It furthermore allows devices to connect to RATs they do not support, via another device (as is the case, for example, when a first terminal device is configured to use only a first RAT such as LTE and a second terminal device is configured to use only a second, different RAT such as UMTS, but each device is able to use either of the first or second RATs when the devices are connected via a common interface). The present technique also allows devices (such as a smartphone and wearable technology such as a smart watch) to implement different functionality (for example, LTE for the smart phone and low-cost LTE for the wearable technology) and to take advantage of each other's capability (as exemplified by the coverage extension scenario when a user enters a low coverage area such as a basement, as previously explained).

It is envisaged that in future telecommunications standards (such as the as yet undefined $5^{th}$ generation (5G) standard(s), for example), the control plane and user plane of the network may be separate. For example, it may be the case that control information is exchanged with UEs (terminal devices) over the control plane via a wider coverage base station, whereas user information is exchanged with UEs over the user plane via one or more smaller cells. In this case, one UE in a group of UEs may act as a relay node for exchange of control information with the network, and another UE in the group may act as a relay node for exchange of user information with the network. In one example, the control plane and user plane may be implemented using different RATs. For example, the control plane may be implemented using LTE and the user plane may be implemented using 5G (in particular, the 5G physical layer, for example).

The control information relay UE and user information relay UE may be determined in a similar way to that previously described. For example, each UE in the group may determine an operational characteristic indicative of that UE's ability to act as either one of the control information relay UE and user information relay UE (this could be based on, for example, radio channel conditions between the UE and the base stations associated with each of the control plane and user plane, the RAT(s) available to the UE and the RATs used for exchange of control information and user information, etc.). Each UE then transmits this operational characteristic to a master UE in the group, which, in turn, transmits relay node establishment signalling to the network indicative that one of the UEs should be established as a control information relay node and that another of the UEs should be established as a user information relay node. The relay node establishment signalling is based on the operational characteristic received by the master UE from each of the other UEs, together with the operational characteristic of the master UE itself. The control information relay node and user information relay node are then determined on the basis of these operational characteristics.

Various features of embodiments of the present technique are defined by the following numbered clauses:

1. A first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the first terminal device comprises:
   a controller operable to determine a value of an operational characteristic associated with the first terminal device; and
   a transceiver unit operable to receive, from each of the other terminal devices, signalling indicative of a value of the operational characteristic associated with that terminal device; wherein
   the transceiver unit is operable to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected on the basis of the value of the operational characteristic associated with the first terminal device as determined by the controller and the values of the operational characteristic associated with the other terminal devices as received by the transceiver unit from the other terminal devices.

2. A first terminal device according to clause 1, wherein, prior to establishment of the second terminal device as a relay node, the first terminal device is a relay node.

3. A first terminal device according to any preceding clause, wherein the operational characteristic is a radio channel condition of a radio communication channel between each respective terminal device and at least one of the base stations, and the terminal device with the best radio channel condition is selected as the second terminal device.

4. A first terminal device according to clause 3, wherein the radio communication channel between each respective terminal device and the at least one of the base stations is implemented via one of a plurality of different radio access technologies (RATs).

5. A first terminal device according to either one of clauses 1 or 2, wherein the operational characteristic is a radio channel condition of a radio communication channel between each respective terminal device and each of the other terminal devices, and the terminal device with the best radio channel condition is selected as the second terminal device.

6. A first terminal device according to either one of clauses 1 or 2, wherein the operational characteristic is a predetermined capability of each terminal device, and the terminal device with the most favourable predetermined capability is selected as the second terminal device.

7. A first terminal device according to either one of clauses 1 or 2, wherein the operational characteristic is a battery energy level of each terminal device, and the terminal device with the highest battery energy level is selected as the second terminal device.

8. A first terminal device according to either one of clauses 1 or 2, wherein the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

9. A first terminal device according to either one of clauses 1 or 2, wherein the operational characteristic is a user selection indicator, the value of the operational characteristic for each respective terminal device being indicative of whether or not that terminal device has been selected, and wherein a terminal device which has been selected by the user is selected as the second terminal device.

10. A first terminal device according to any preceding clause, wherein the controller is operable to select the second terminal device on the basis of the value of the operational characteristic associated with the first terminal device as determined by the controller and the values of the operational characteristic associated with the other terminal devices as received by the transceiver unit, and the relay node establishment signalling transmitted to the first one of the base stations by the second transceiver is indicative of the selected second terminal device.

11. A first terminal device according to any one of clauses 1 to 8, wherein the relay node establishment signalling transmitted to the first one of the base stations by the second transceiver is indicative of the value of the operational characteristic associated with the first terminal device as determined by the controller and the values of the operational characteristic associated with the other terminal devices as received by the transceiver unit.

12. A first terminal device according to clause 1, wherein:
the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein when the operational characteristic is indicative of the ability of each terminal device to act as a control plane relay node via which each of the other terminal devices is operable to exchange control plane signalling with at least one of the base stations, the relay node establishment signalling provides the first one of the base stations with an indication that one of the terminal devices should be established as the control plane relay node, the one of the terminal devices that should be established as the control plane relay node being determined on the basis of the values of the operational characteristic associated with each of the terminal devices; and when the operational characteristic is indicative of the ability of each terminal device to act as a user plane relay node via which each of the other terminal devices is operable to exchange user plane data with at least one of the base stations, the relay node establishment signalling provides the first one of the base stations with an indication that one of the terminal devices should be established as the user plane relay node, the one of the terminal devices that should be established as the user plane relay node being determined on the basis of the values of the operational characteristic associated with each of the terminal devices.

13. A base station for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the base station comprises:
a transceiver operable to receive relay node establishment signalling from a first one of the terminal devices, the relay node establishment signalling providing an indication that a second one of the terminal devices should be established as a relay node via which each of the other terminal devices is operable to communicate with at least one of the base stations; and
a controller operable to perform an operation to establish, on the basis of the received relay node establishment signalling, a second one of the terminal devices as a relay node via which each of the other terminal devices is operable to communicate with at least one of the base stations, wherein the second terminal device established as the relay node is selected on the basis of a value of a operational characteristic associated with the first terminal device as determined by the first terminal device and a value of the operational characteristic associated with each of the other terminal devices as received by the first terminal device from each of the other terminal devices.

14. A base station according to clause 13, wherein the operational characteristic is a radio channel condition of a radio communication channel between each respective terminal device and at least one of the base stations, and the terminal device with the best radio channel condition is selected as the second terminal device.

15. A base station according to clause 14, wherein the radio communication channel between each respective terminal device and the at least one of the base stations is implemented via one of a plurality of different radio access technologies (RATs).

16. A station according to clause 13, wherein the operational characteristic is a radio channel condition of a radio communication channel between each respective terminal device and each of the other terminal devices, and the terminal device with the best radio channel condition is selected as the second terminal device.

17. A base station according to clause 13, wherein the operational characteristic is a predetermined capability of each terminal device, and the terminal device with the most favourable predetermined capability is selected as the second terminal device.

18. A base station according to clause 13, wherein the operational characteristic is a battery energy level of each terminal device, and the terminal device with the highest battery energy level is selected as the second terminal device.

19. A base station according to clause 13, wherein the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

20. A base station according to clause 13, wherein the operational characteristic is a user selection indicator, the value of the operational characteristic for each respective terminal device being indicative of whether or not that terminal device has been selected, and wherein a terminal device which has been selected by the user is selected as the second terminal device.

21. A base station according to any one of clauses 13 to 20, wherein the relay node establishment signalling received by the transceiver is indicative of the selected second terminal device, and the controller is operable to establish, as the second terminal device, the terminal device indicated by the relay node establishment signalling.

22. A base station according to any one of clauses 13 to 21, wherein the relay node establishment signalling received by the transceiver is indicative of the value of the operational characteristic associated with the first terminal device as determined by the first terminal device and the value of the operational characteristic associated with each of the other terminal devices as received by the first terminal device, and the controller is operable to select the second terminal device on the basis of the value of the operational characteristic associated with each of the terminal devices and to establish the selected terminal device as the second terminal device.

23. A base station according to clause 13, wherein:
the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein
when the operational characteristic is indicative of the ability of each terminal device to act as a control plane relay node via which each of the other terminal devices is operable to exchange control plane signalling with at least one of the base stations, the relay node establishment signalling provides an indication that one of the terminal devices should be established as the control plane relay node, and the controller is operable to perform an operation to establish, on the basis of the received relay node establishment signalling, the terminal device to act as the control plane relay node, wherein the terminal device to act as the control plane relay node is selected on the basis of the values of the operational characteristic associated with each of the terminal devices; and
when the operational characteristic is indicative of the ability of each terminal device to act as a user plane relay node via which each of the other terminal devices is operable to exchange user plane data with at least one of the base stations, the relay node establishment signalling provides an indication that one of the terminal devices should be established as the user plane relay node, and the controller is operable to perform an operation to establish, on the basis of the received relay node establishment signalling, the terminal device to act as the user plane relay node, wherein the terminal device to act as the user plane relay node is selected on the basis of the values of the operational characteristic associated with each of the terminal devices.

24. A wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein:
a first terminal device of the terminal devices is operable to determine a value of a operational characteristic associated with the first terminal device and to receive, from each of the other terminal devices, a value of the operational characteristic associated with each of the other terminal devices; and
a controller of the wireless telecommunications system is operable to perform, on the basis of relay node establishment signalling received from the first terminal device at a first one of the base stations, an operation to establish a second terminal device of the terminal devices as a relay node via which each of the other terminal devices is operable to communicate with at least one of the base stations, wherein the relay node establishment signalling provides the first one of the base stations with an indication that a second terminal device should be established as a relay node via which each of the other terminal devices is operable to communicate with at least one of the base stations, and wherein the second terminal device established as the relay node is selected on the basis of the value of the operational characteristic associated with the first terminal device and the values of the operational characteristic associated with the other terminal devices received by the first terminal device from the other terminal devices.

25. A wireless telecommunications system according to clause 24, wherein:
the wireless telecommunication system comprises at least two base stations each operable to use a different radio access technology (RAT) to each other; and
at least two of the terminal devices in the plurality of terminal devices are operable to exchange signalling with a respective one of the at least two base stations using the RAT associated with that base station when acting as a relay node.

26. A wireless telecommunications system according to either one of clauses 24 or 25, wherein, prior to establishment of the second terminal device as a relay node, the first terminal device is a relay node.

27. A wireless telecommunications system according to any one of clauses 24 to 26, wherein the operational characteristic is a radio channel condition of a radio communication channel between each respective terminal device and at least one of the base stations, and the terminal device with the best radio channel condition is selected as the second terminal device.

28. A wireless telecommunications system according to any one of clauses 24 to 26, wherein the operational characteristic is a radio channel condition of a radio communication channel between each respective terminal device and each of the other terminal devices, and the terminal device with the best radio channel condition is selected as the second terminal device.

29. A wireless telecommunications system according to any one of clauses 24 to 26, wherein the operational characteristic is a predetermined capability of each terminal device, and the terminal device with the most favourable predetermined capability is selected as the second terminal device.

30. A wireless telecommunications system according to any one of clauses 24 to 26, wherein the operational characteristic is a battery energy level of each terminal device, and the terminal device with the highest battery energy level is selected as the second terminal device.

31. A wireless telecommunications system according to any one of clauses 24 to 26, wherein the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

32. A wireless telecommunications system according to any one of clauses 24 to 26, wherein the operational characteristic is a user selection indicator, the value of the operational characteristic for each respective terminal device being indicative of whether or not that terminal device has been selected, and wherein a terminal device which has been selected by the user is selected as the second terminal device.

33. A wireless telecommunications system according to any one of clauses 24 to 32, wherein the second terminal device is selected by the first terminal device and the relay node establishment signalling transmitted to the first one of the base stations by the first terminal device is indicative of the selected second terminal device.

34. A wireless telecommunications system according to any one of clauses 24 to 32, wherein the second terminal device is selected by the controller of the wireless telecommunications system and the relay node establishment signalling transmitted to the first one of the base stations by the first terminal device is indicative of the value of the operational characteristic associated with each of the terminal devices.

35. A wireless telecommunications system according to clause 24, wherein:
the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein
when the operational characteristic is indicative of the ability of each terminal device to act as a control plane relay node via which each of the other terminal devices is operable to exchange control plane signalling with at least one of the base stations, the relay node establishment signalling provides an indication that one of the terminal devices should be established as the control plane relay node, and the controller of the wireless telecommunications system is operable to perform an operation to establish, on the basis of the received relay node establishment signalling, the terminal device to act as the control plane relay node, wherein the terminal device to act as the control plane relay node is selected on the basis of the values of the operational characteristic associated with each of the terminal devices; and
when the operational characteristic is indicative of the ability of each terminal device to act as a user plane relay node via which each of the other terminal devices is operable to exchange user plane data with at least one of the base stations, the relay node establishment signalling provides an indication that one of the terminal devices should be established as the user plane relay node, and the controller of the wireless telecommunications system is operable to perform an operation to establish, on the basis of the received relay node establishment signalling, the terminal device to act as the user plane relay node, wherein the terminal device to act as the user plane relay node is selected on the basis of the values of the operational characteristic associated with each of the terminal devices.

36. A method of operating a first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, the method comprising:
determining a value of an operational characteristic associated with the first terminal device; and
controlling a transceiver unit of the first terminal device to receive, from each of the other terminal devices, signalling indicative of a value of the operational characteristic associated with that terminal device; wherein
the transceiver unit is controlled to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected on the basis of the determined value of the operational characteristic associated with the first terminal device and the values of the operational characteristic associated with the other terminal devices as received by the transceiver unit from the other terminal devices.

37. A method of operating a base station for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, the method comprising:
controlling a transceiver of the base station to receive relay node establishment signalling from a first one of the terminal devices, the relay node establishment signalling providing an indication that a second one of the terminal devices should be established as a relay node via which each of the other terminal devices is operable to communicate with at least one of the base stations; and
performing an operation to establish, on the basis of the received relay node establishment signalling, a second one of the terminal devices as a relay node via which each of the other terminal devices is operable to communicate with at least one of the base stations, wherein the second terminal device established as the relay node is selected on the basis of a value of an operational characteristic associated with the first terminal device as determined by the first terminal device and a value of the operational characteristic associated with each of the other terminal devices as received by the first terminal device from each of the other terminal devices.

38. A method of operating a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein a first terminal device of the terminal devices is operable to determine a value of a operational characteristic associated with the first terminal device and to receive, from each of the other terminal devices, a value of the operational characteristic associated with each of the other terminal devices, the method comprising:

performing, on the basis of relay node establishment signalling received from the first terminal device at a first one of the base stations, an operation to establish a second terminal device of the terminal devices as a relay node via which each of the other terminal devices is operable to communicate with at least one of the base stations, wherein the relay node establishment signalling provides the first one of the base stations with an indication that a second terminal device should be established as a relay node via which each of the other terminal devices is operable to communicate with at least one of the base stations, and wherein the second terminal device established as the relay node is selected on the basis of the value of the operational characteristic associated with the first terminal device and the values of the operational characteristic associated with the other terminal devices received by the first terminal device from the other terminal devices.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.

The invention claimed is:

1. A first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the first terminal device comprises:

a controller operable to determine a value of an operational characteristic associated with the first terminal device; and a transceiver unit operable to receive, from each of the other terminal devices, signalling indicative of a value of the operational characteristic associated with that terminal device, wherein the transceiver unit is operable to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected by the first terminal device on the basis of the value of the operational characteristic associated with the first terminal device as determined by the controller and the values of the operational characteristic associated with the other terminal devices as received by the transceiver unit from the other terminal devices, and wherein the indication comprises an identification of the second terminal device.

2. The first terminal device according to claim 1, wherein, prior to establishment of the second terminal device as a relay node, the first terminal device is a relay node.

3. The first terminal device according to claim 1, wherein the operational characteristic is a radio channel condition of a radio communication channel between each respective terminal device and at least one of the base stations, and the terminal device with the best radio channel condition is selected as the second terminal device.

4. The first terminal device according to claim 3, wherein the radio communication channel between each respective terminal device and the at least one of the base stations is implemented via one of a plurality of different radio access technologies (RATs).

5. The first terminal device according to claim 1, wherein the operational characteristic is a radio channel condition of a radio communication channel between each respective terminal device and each of the other terminal devices, and the terminal device with the best radio channel condition is selected as the second terminal device.

6. The first terminal device according to claim 1, wherein the operational characteristic is a predetermined capability of each terminal device, and the terminal device with the most favourable predetermined capability is selected as the second terminal device.

7. The first terminal device according to claim 1, wherein the operational characteristic is a battery energy level of each terminal device, and the terminal device with the highest battery energy level is selected as the second terminal device.

8. The first terminal device according to claim 1, wherein the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

9. The first terminal device according to claim 1, wherein the operational characteristic is a user selection indicator, the value of the operational characteristic for each respective terminal device being indicative of whether or not that terminal device has been selected, and wherein a terminal device which has been selected by the user is selected as the second terminal device.

10. The first terminal device according to claim 1, wherein the controller is operable to select the second terminal device on the basis of the value of the operational characteristic associated with the first terminal device as determined by the controller and the values of the operational characteristic associated with the other terminal devices as received by the transceiver unit, and the relay node establishment signalling transmitted to the first one of the base stations by a second transceiver is indicative of the selected second terminal device.

11. The first terminal device according to claim 1, wherein the relay node establishment signalling transmitted to the first one of the base stations by a second transceiver is indicative of the value of the operational characteristic associated with the first terminal device as determined by the controller and the values of the operational characteristic associated with the other terminal devices as received by the transceiver unit.

12. The first terminal device according to claim 1, wherein:
the operational characteristic is indicative of at least one of (a) the ability of each terminal device to act as a control plane relay node via which each of the other terminal devices is operable to exchange control plane signalling with at least one of the base stations and (b) the ability of each terminal device to act as a user plane relay node via which each of the other terminal devices is operable to exchange user plane data with at least one of the base stations; wherein
when the operational characteristic is indicative of the ability of each terminal device to act as a control plane relay node via which each of the other terminal devices is operable to exchange control plane signalling with at least one of the base stations, the relay node establishment signalling provides the first one of the base stations with an indication that one of the terminal devices should be established as the control plane relay node, the one of the terminal devices that should be established as the control plane relay node being determined on the basis of the values of the operational characteristic associated with each of the terminal devices; and
when the operational characteristic is indicative of the ability of each terminal device to act as a user plane relay node via which each of the other terminal devices is operable to exchange user plane data with at least one of the base stations, the relay node establishment signalling provides the first one of the base stations with an indication that one of the terminal devices should be established as the user plane relay node, the one of the terminal devices that should be established as the user plane relay node being determined on the basis of the values of the operational characteristic associated with each of the terminal devices.

13. A base station for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, and wherein the base station comprises:
a transceiver operable to receive relay node establishment signalling from a first one of the terminal devices, the relay node establishment signalling providing an indication that a second one of the terminal devices should be established as a relay node via which each of the other terminal devices is operable to communicate with at least one of the base stations; and
a controller operable to perform an operation to establish, on the basis of the received relay node establishment signalling, the second terminal device as a relay node via which each of the other terminal devices is operable to communicate with at least one of the base stations,
wherein the second terminal device established as the relay node is selected by the first terminal device on the basis of a value of a operational characteristic associated with the first terminal device as determined by the first terminal device and a value of the operational characteristic associated with each of the other terminal devices as received by the first terminal device from each of the other terminal devices, and
wherein the indication comprises an identification of the second terminal device.

14. The base station according to claim 13, wherein the operational characteristic is a radio channel condition of a radio communication channel between each respective terminal device and at least one of the base stations, and the terminal device with the best radio channel condition is selected as the second terminal device.

15. The base station according to claim 14, wherein the radio communication channel between each respective terminal device and the at least one of the base stations is implemented via one of a plurality of different radio access technologies (RATs).

16. The base station according to claim 13, wherein the operational characteristic is a radio channel condition of a radio communication channel between each respective terminal device and each of the other terminal devices, and the terminal device with the best radio channel condition is selected as the second terminal device.

17. The base station according to claim 13, wherein the operational characteristic is a predetermined capability of each terminal device, and the terminal device with the most favourable predetermined capability is selected as the second terminal device.

18. The base station according to claim 13, wherein the operational characteristic is a battery energy level of each terminal device, and the terminal device with the highest battery energy level is selected as the second terminal device.

19. The base station according to claim 13, wherein the operational characteristic is a financial cost of exchanging data over a radio communication channel between each respective terminal device and at least one of the base stations, and the terminal device associated with the lowest financial cost of exchanging data with the at least one base station over its respective radio communication channel is selected as the second terminal device.

20. A method of operating a first terminal device for use in a wireless telecommunications system comprising one or more base stations each forming a respective network node of the wireless telecommunications system and a plurality of terminal devices, wherein each of the terminal devices is operable to be established as a relay node via which each of the other terminal devices is operable to communicate with at least one of the base stations, the method comprising:

determining a value of an operational characteristic associated with the first terminal device; and controlling a transceiver unit of the first terminal device to receive, from each of the other terminal devices, signalling indicative of a value of the operational characteristic associated with that terminal device, wherein the transceiver unit is controlled to transmit relay node establishment signalling to a first one of the base stations to provide the first one of the base stations with an indication that a second terminal device should be established as a relay node via which each of the other terminal devices is operable to communicate with at least one of the base stations, wherein the second terminal device is selected by the first terminal device on the basis of the determined value of the operational characteristic associated with the first terminal device and the values of the operational characteristic associated with the other terminal devices as received by the transceiver unit from the other terminal devices, and wherein the indication comprises an identification of the second terminal device.

* * * * *